United States Patent
Han et al.

(10) Patent No.: US 11,664,494 B2
(45) Date of Patent: May 30, 2023

(54) COMPOSITE MATERIAL INCLUDING SELENIUM, METHOD OF FABRICATING THE SAME, LITHIUM ION AND LITHIUM SELENIUM SECONDARY BATTERIES INCLUDING THE SAME, AND LITHIUM ION CAPACITOR INCLUDING THE SAME

(71) Applicant: IUCF-HYU (INDUSTRY-UNIVERSITY COOPERATION FOUNDATION HANYANG UNIVERSITY), Seoul (KR)

(72) Inventors: Sung-Hwan Han, Seoul (KR); Joong-Hee Han, Vienna (AT)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 281 days.

(21) Appl. No.: 16/962,728

(22) PCT Filed: Jan. 17, 2019

(86) PCT No.: PCT/KR2019/000672
§ 371 (c)(1),
(2) Date: Jul. 16, 2020

(87) PCT Pub. No.: WO2019/143135
PCT Pub. Date: Jul. 25, 2019

(65) Prior Publication Data
US 2020/0343540 A1 Oct. 29, 2020

(30) Foreign Application Priority Data
Jan. 17, 2018 (KR) .......................... 10-2018-0005887

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/382* (2013.01);
(Continued)

(58) Field of Classification Search
None
See application file for complete search history.

(56) References Cited

FOREIGN PATENT DOCUMENTS

| CN | 104733677 A | 6/2015 |
| CN | 107170974 A | 9/2017 |

OTHER PUBLICATIONS

Youngchao Tang et al., "Carbon-Stabilized Interlayer-Expanded Few-Layer MoSe2 Nanosheets for Sodium Ion Batteries with Enhanced Rate Capability and Cycling Performance", ACS Applied Materials & Interfaces, 2016, pp. 32324-32332, vol. 8, No. 47.
(Continued)

*Primary Examiner* — Wyatt P McConnell
(74) *Attorney, Agent, or Firm* — Sughrue Mion, PLLC

(57) ABSTRACT

A composite material is provided. The composite material includes carbon layers and metal compound layers alternately and repeatedly stacked. Each of the metal compound layers includes molybdenum and selenium. When the composite material is used as a positive active material for a lithium selenium secondary battery, selenium is separated from the metal compound layer through a preliminary charge/discharge process. In addition, the composite material may be used as negative active materials of a lithium ion battery and a lithium ion capacitor. Furthermore, the composite material may be used as an active material of a positive electrode of the lithium selenium secondary battery.

11 Claims, 13 Drawing Sheets

(51) Int. Cl.
*H01M 4/38* (2006.01)
*H01M 4/583* (2010.01)
*H01M 10/0525* (2010.01)
*H01M 4/02* (2006.01)

(52) U.S. Cl.
CPC ....... *H01M 4/583* (2013.01); *H01M 10/0525* (2013.01); *H01M 2004/027* (2013.01); *H01M 2004/028* (2013.01)

(56) References Cited

OTHER PUBLICATIONS

Lu Chen et al., "MoS2/graphene nanocomposite with enlarged interlayer distance as a high performance anode material for lithium-ion battery", Journal of materials research, 2016, pp. 3151-3160, vol. 31, No. 20.
Hao Luo et al., "Synthesis of MoS2/C Submicrosphere by PVP-Assisted Hydrothermal Method for Lithium Ion Battery", Advanced Materials Research, 2012, pp. 471-477, vol. 531.
International Search Report for PCT/KR2019/000672, dated Apr. 26, 2019.

[FIG. 1]
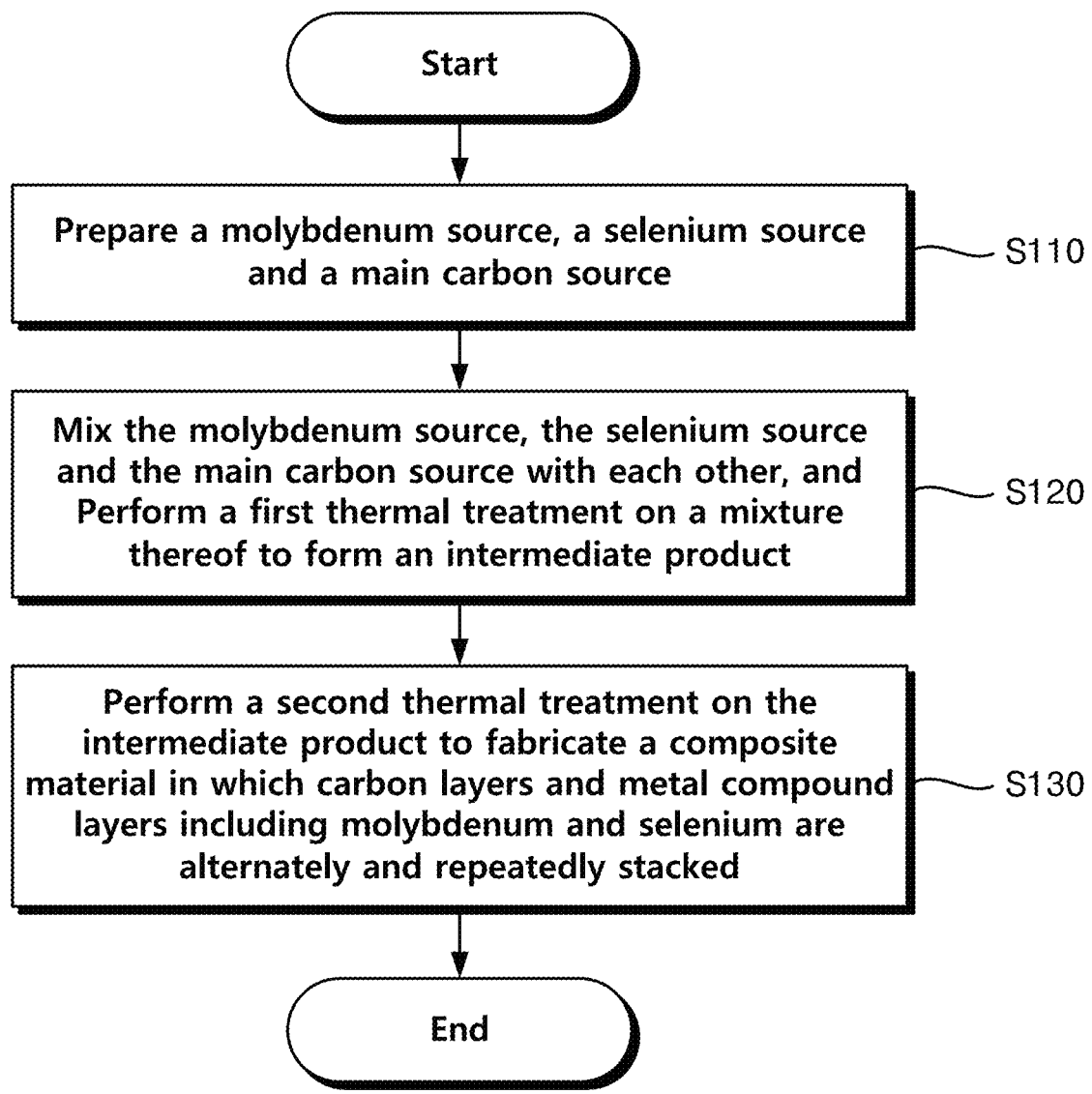

[FIG. 2]
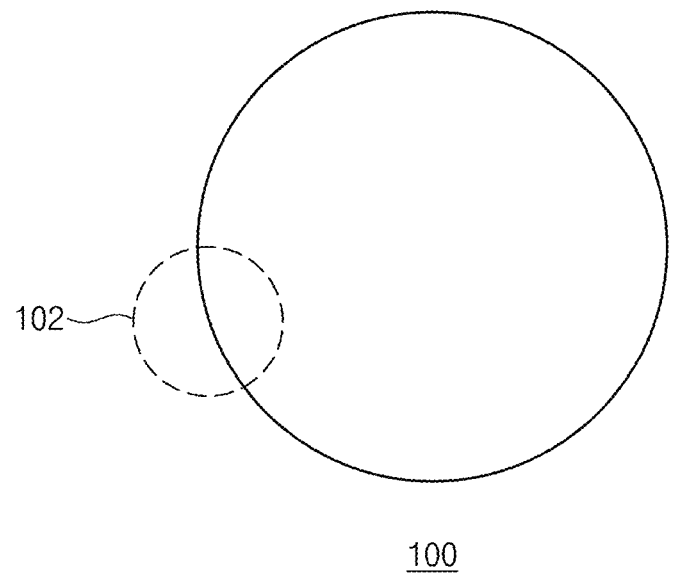
[FIG. 3]
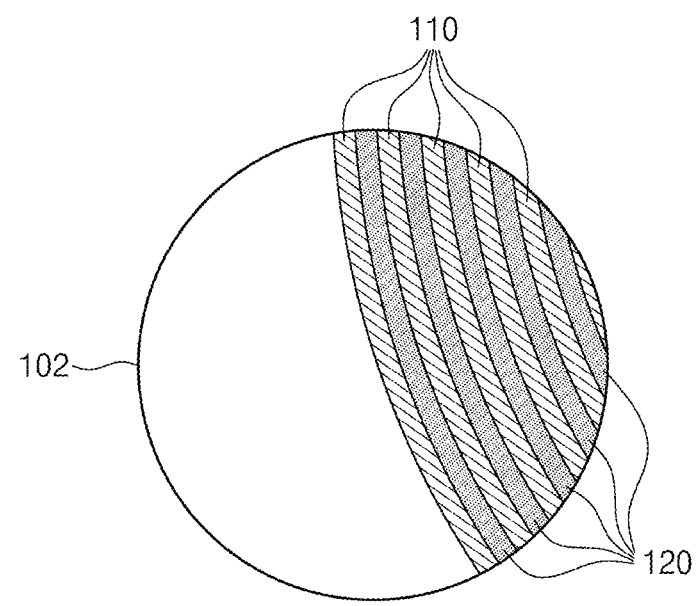

[FIG. 4]
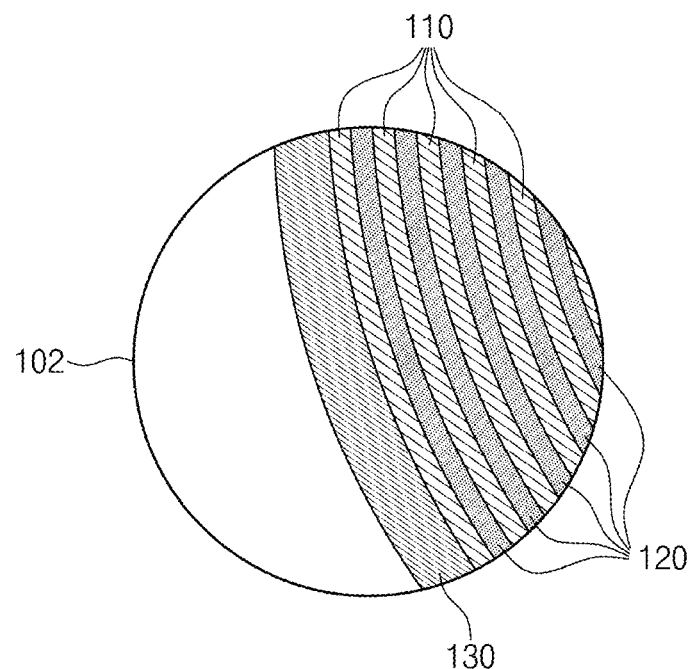
[FIG. 5]
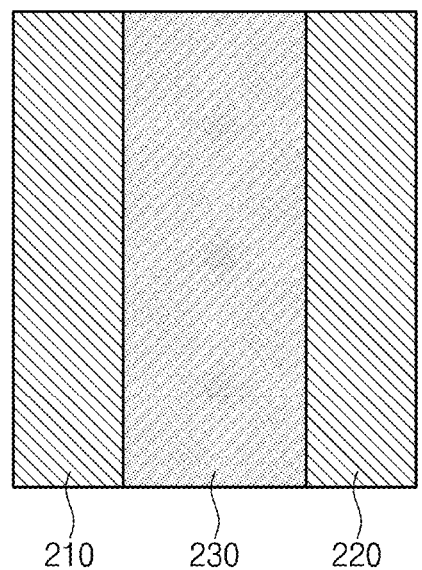

[FIG. 6]
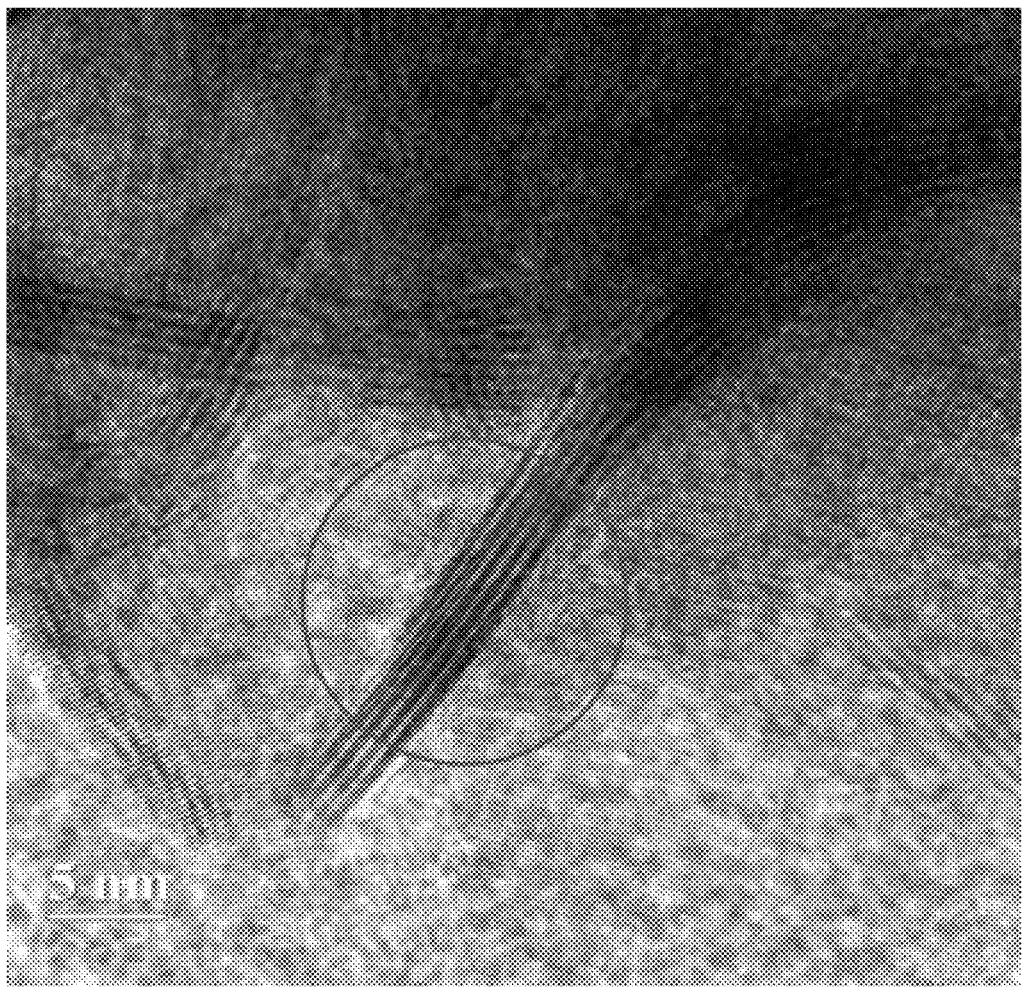

[FIG. 7]
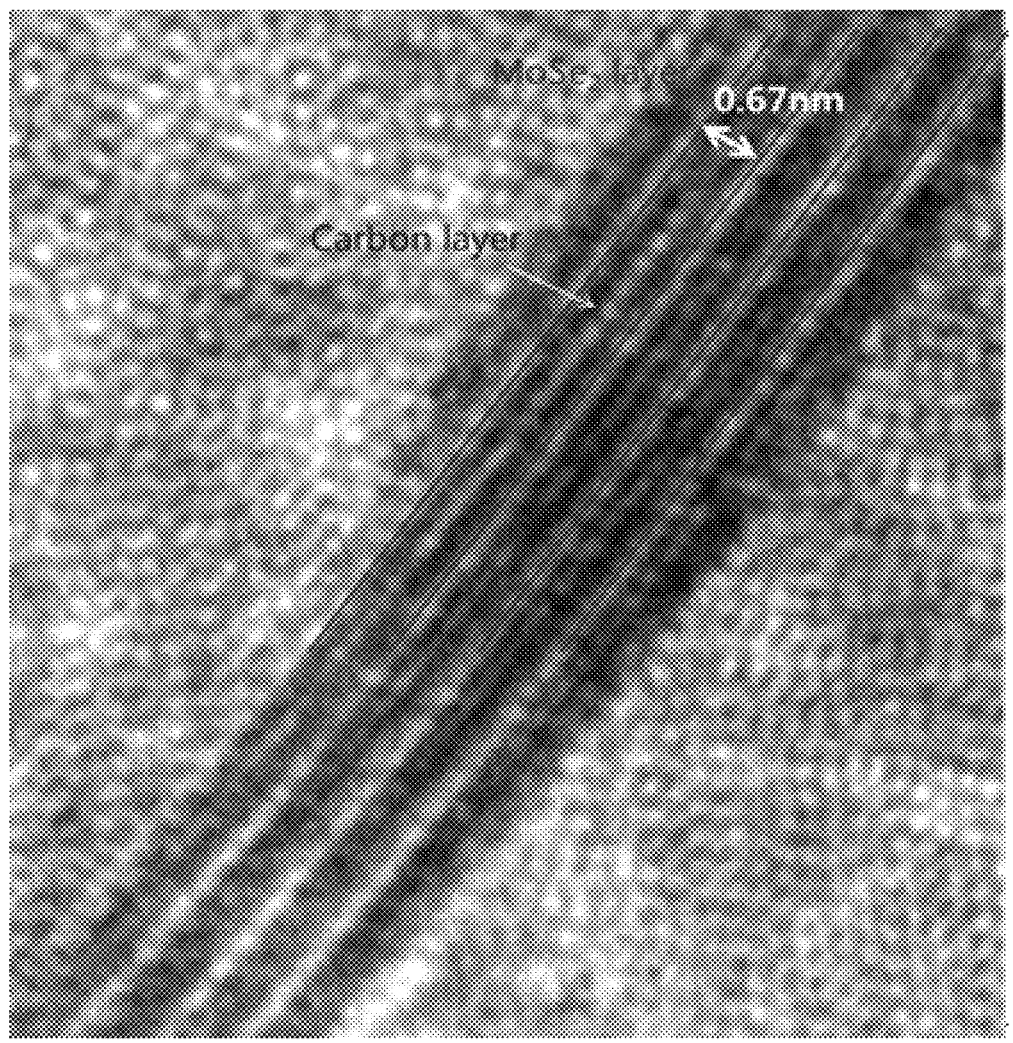

[FIG. 8]
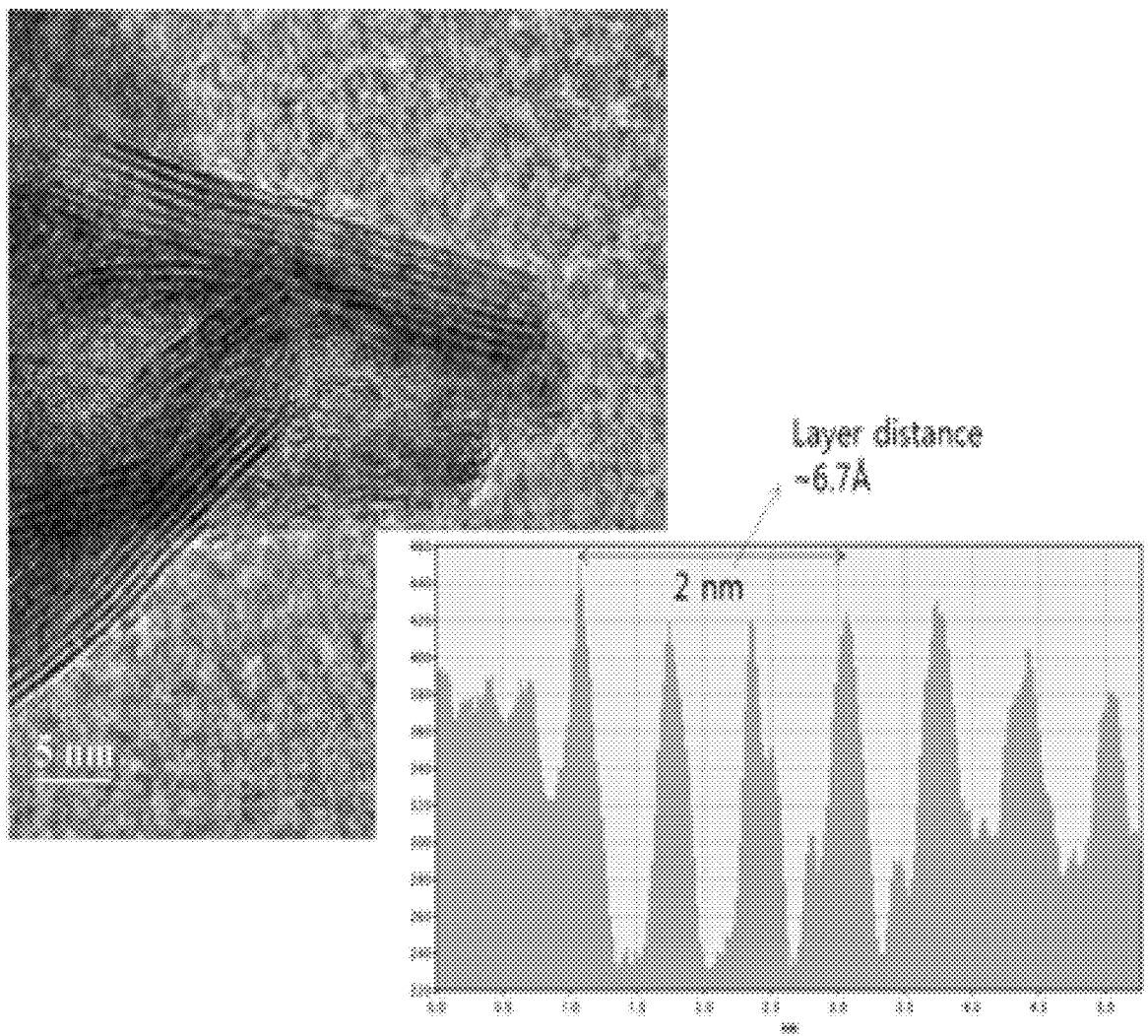

[FIG. 9]
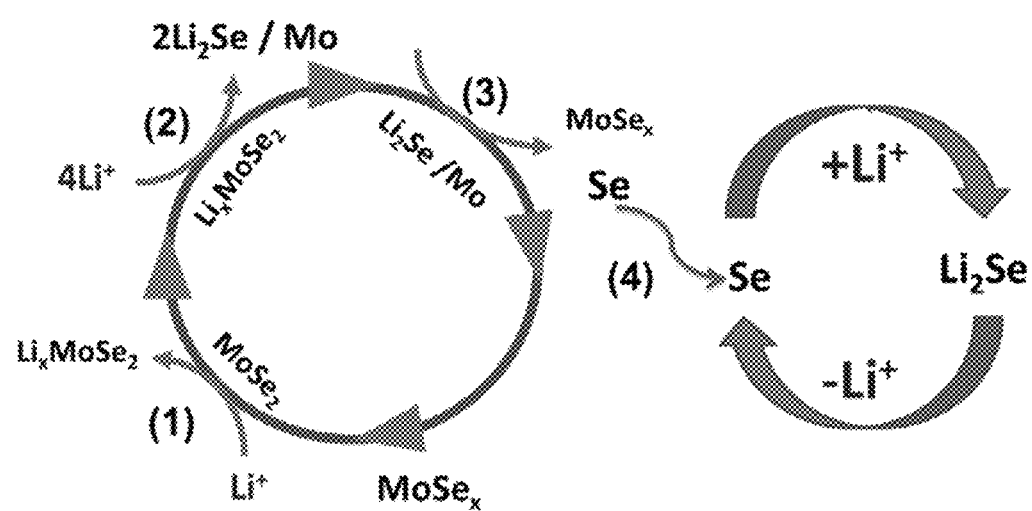

[FIG. 10]
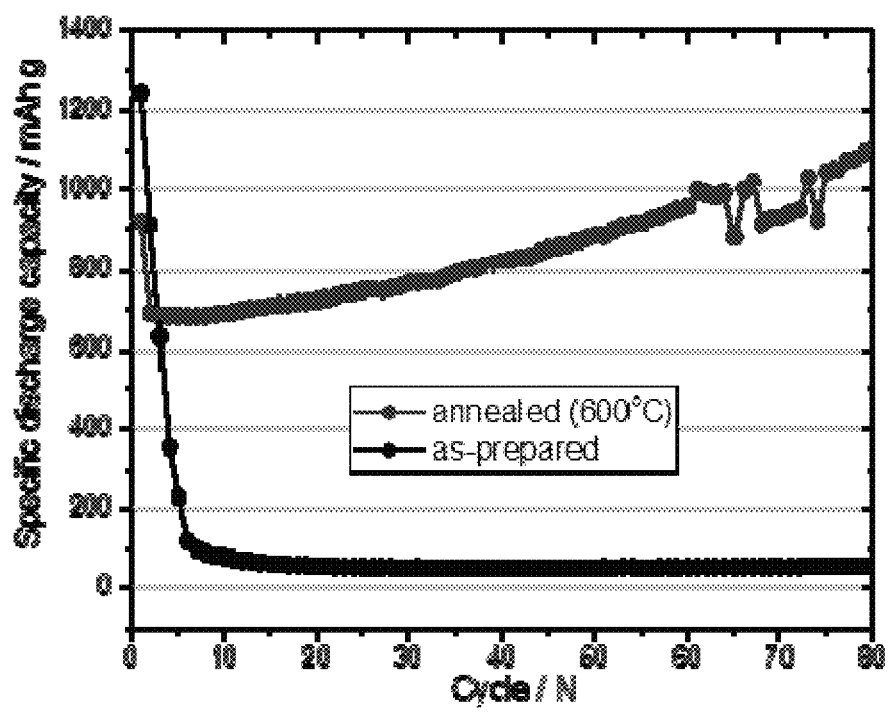

[FIG. 11]
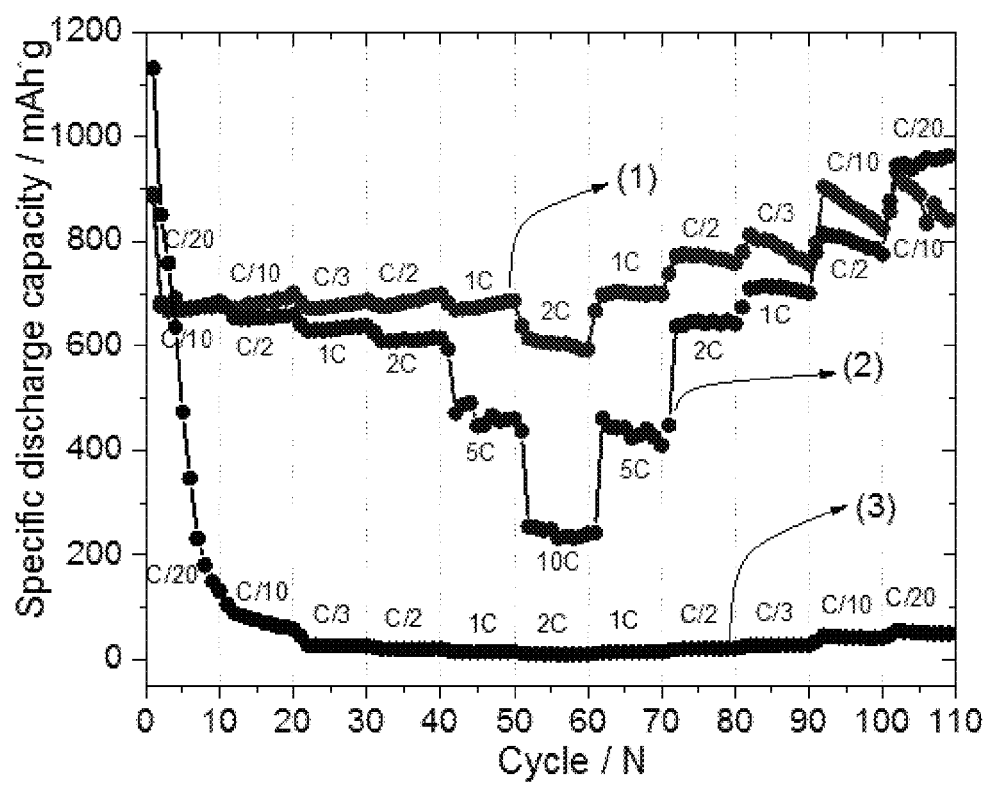

[FIG. 12]
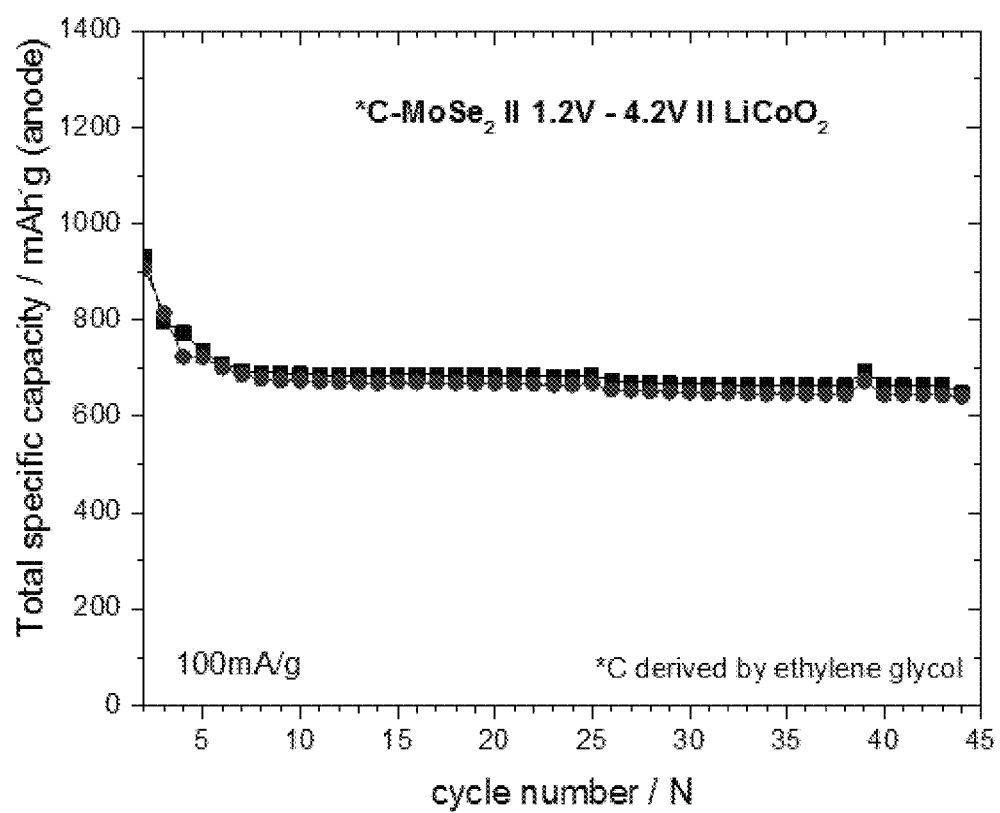

[FIG. 13]
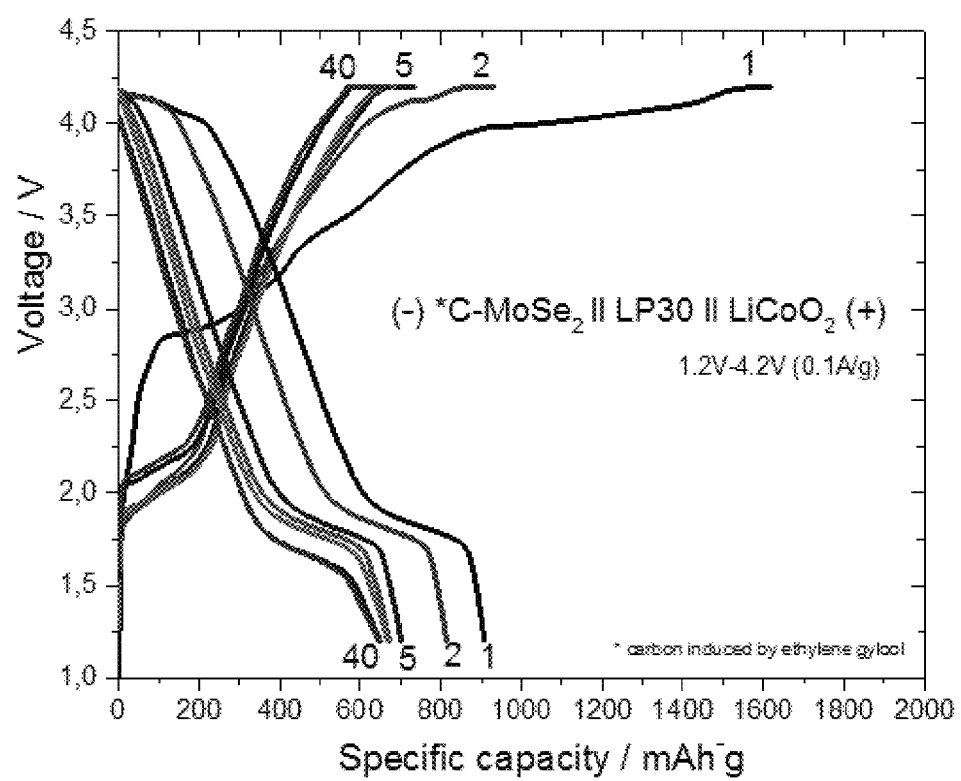

[FIG. 14]
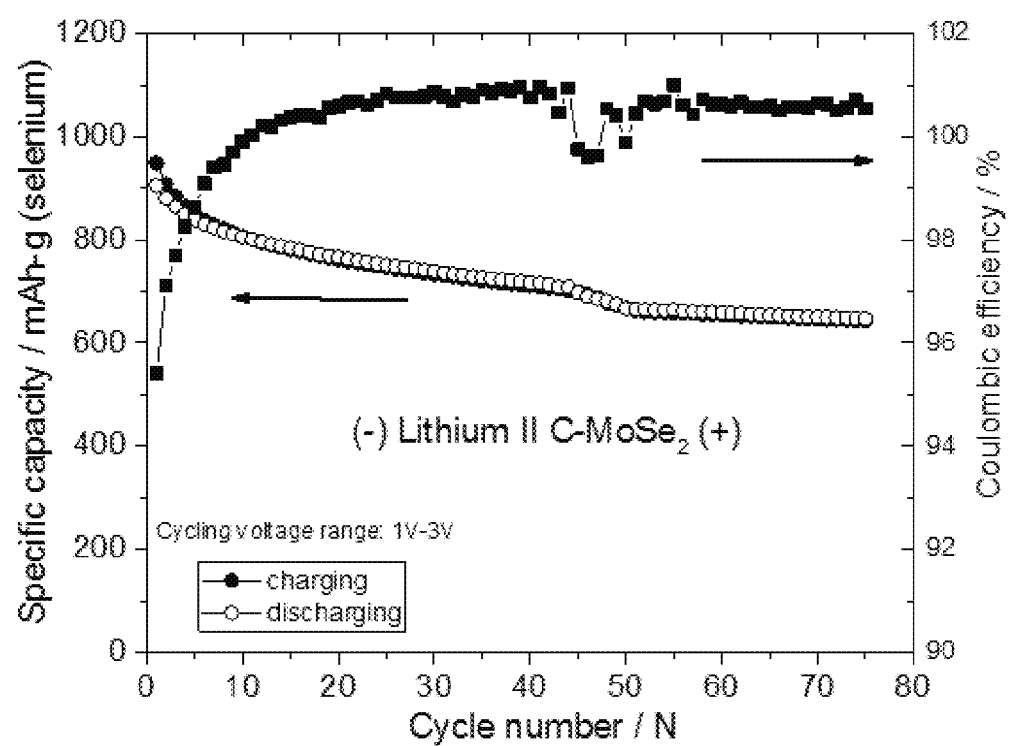

[FIG. 15]
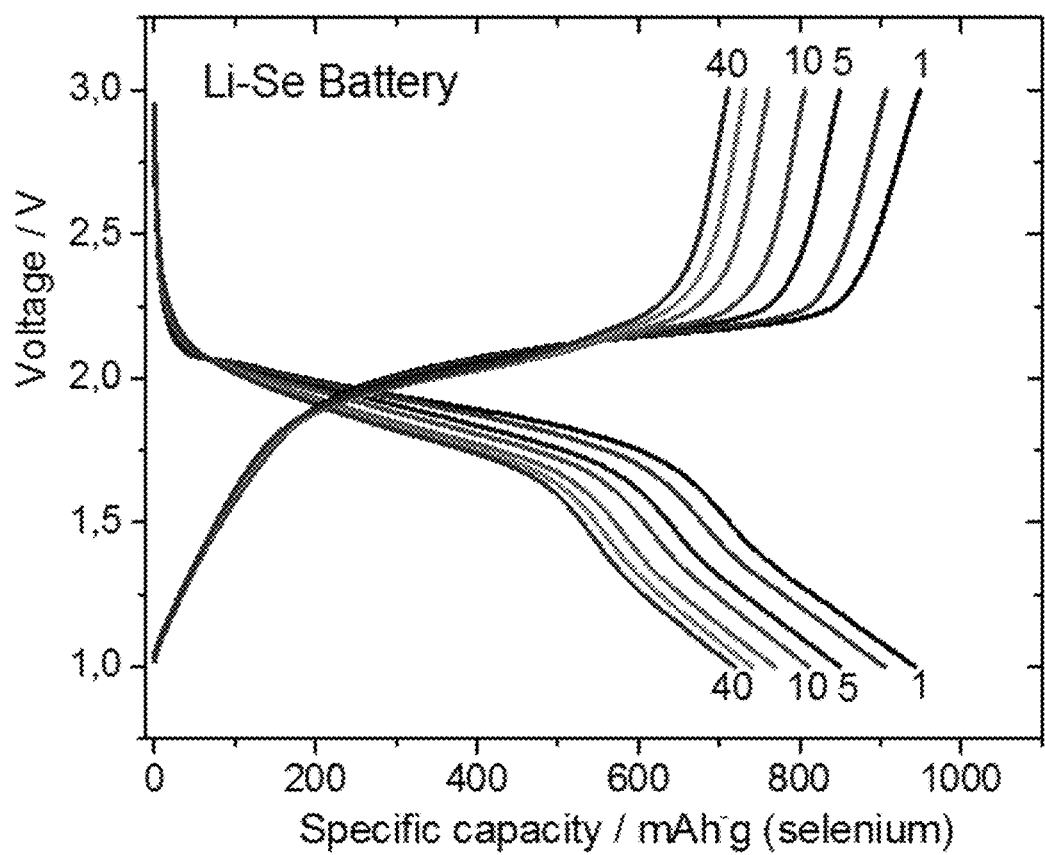

COMPOSITE MATERIAL INCLUDING SELENIUM, METHOD OF FABRICATING THE SAME, LITHIUM ION AND LITHIUM SELENIUM SECONDARY BATTERIES INCLUDING THE SAME, AND LITHIUM ION CAPACITOR INCLUDING THE SAME

CROSS REFERENCE TO RELATED APPLICATIONS

This application is a National Stage of International Application No. PCT/KR2019/000672 filed Jan. 17, 2019, claiming priority based on Korean Patent Application No. 10-2018-0005887 filed Jan. 17, 2018.

BACKGROUND

1. Field

Embodiments of the inventive concepts relate to a composite material, a method of fabricating the same, lithium ion and lithium selenium secondary batteries including the same, and a lithium ion capacitor including the same. More particularly, embodiments of the inventive concepts relate to a composite material including molybdenum and selenium, a method of fabricating the same, lithium ion and lithium selenium secondary batteries including the same, and a lithium ion capacitor including the same.

2. Description of the Related Art

Materials are applied to various fields such as cars, electric home appliances and construction and greatly affect quality, performance and prices of products. Various new materials are used in many fields in daily life, such as cosmetics, clothing, sports equipment, paint, packaging, and food. Applications of these new materials are expanded to high-tech fields such as information technology (IT), biotechnology (BT), and environmental technology (ET).

In particular, lithium secondary batteries capable of storing electric energy are increasingly demanded by the expensive spread of electric cars and energy storage systems (ESS) as well as various portable electronic devices (e.g., smart phones, MP3 players, tablet PC, and notebook computers).

For example, Korean Patent Publication No. 10-2016-0087353 discloses a positive active material and a method of fabricating the same. In detail, Korean Patent Publication No. 10-2016-0087353 discloses a composite for forming a positive electrode of a lithium secondary battery, in which dispersibility of a conductive material, a binder and composite ingredients is improved. In addition, according to Korean Patent Publication No. 10-2016-0087353, a positive electrode formed using the composite may reduce an inner resistance of a battery including the positive electrode and may improve an output characteristic of the battery.

Various positive electrode materials and negative electrode materials have been studied to improve performance of the lithium secondary battery. In particular, various negative electrode materials for replacing a conventional graphite-based negative electrode have been studied to increase an energy density and a weight density of the lithium secondary battery. Silicon, tin, bismuth, gallium and antimony among these materials have been studied as metals that can be alloyed with lithium. However, these metals may cause defects of electrodes by large volume expansion even though capacities of batteries using these metals are theoretically 5 to 10 times greater than that of a battery using graphite.

SUMMARY

Embodiments of the inventive concepts may provide a composite material in which metal compound layers including molybdenum and selenium and carbon layers are alternately and repeatedly stacked, and a method of fabricating the same.

Embodiments of the inventive concepts may also provide a negative active material for a high-capacity lithium ion secondary battery and a method of fabricating the same.

Embodiments of the inventive concepts may further provide a positive active material for a high-reliable lithium selenium secondary battery and a method of fabricating the same.

Embodiments of the inventive concepts may further provide a positive active material for a high-capacity lithium selenium secondary battery and a method of fabricating the same.

Embodiments of the inventive concepts may further provide a positive active material for a lithium selenium secondary battery, which is capable of minimizing elution of selenium, and a method of fabricating the same.

Embodiments of the inventive concepts may further provide a positive active material for a lithium selenium secondary battery, which is capable of improving life characteristics, and a method of fabricating the same.

Embodiments of the inventive concepts may further provide a positive active material for a lithium selenium secondary battery, in which carbon layers and metal compound layers are alternately stacked, and a method of fabricating the same.

Embodiments of the inventive concepts may further provide a lithium ion secondary battery that includes a negative active material having a composite material in which metal compound layers including molybdenum and selenium and carbon layers are alternately and repeatedly stacked, and a method of fabricating the same.

Embodiments of the inventive concepts may further provide a high-capacity, high-stable and high-speed charge/discharge lithium ion capacitor that includes a negative active material having a composite material in which metal compound layers including molybdenum and selenium and carbon layers are alternately and repeatedly stacked, and a method of fabricating the same.

In an aspect, a composite material may include carbon layers and metal compound layers alternately and repeatedly stacked, and each of the metal compound layers may include molybdenum and selenium.

In some embodiments, each of the carbon layers may include a graphene layer or a graphene oxide layer.

In some embodiments, a distance between the metal compound layers may range from 5 Å to 15 Å.

In some embodiments, the carbon layer may be inherently provided between the metal compound layers.

In some embodiments, the composite material may further include a carbon shell layer surrounding the carbon layers and the metal compound layers alternately and repeatedly stacked.

In some embodiments, at least a portion of the metal compound layer may be provided as a monolayer.

In another aspect, a method of fabricating a composite material may include preparing a molybdenum source, a selenium source, and a main carbon source, mixing the molybdenum source, the selenium source, and the main carbon source with each other to obtain a mixture thereof, forming an intermediate product by performing a first thermal treatment on the mixture, and performing a second thermal treatment on the intermediate product to fabricate a composite material comprising carbon layers and metal compound layers alternately and repeatedly stacked. Each of the metal compound layers may include molybdenum and selenium.

In some embodiments, the intermediate product may include the metal compound layers and the main carbon sources alternately and repeatedly stacked, and each of the metal compound layers of the intermediate product may include molybdenum and selenium. A distance between the metal compound layers in the intermediate product may be greater than a distance between the metal compound layers in the composite material.

In some embodiments, each of the carbon layers may include a graphene layer or a graphene oxide layer.

In some embodiments, the method may further include adding an auxiliary carbon source to the intermediate product before the performing of the second thermal treatment on the intermediate product, and performing an auxiliary thermal treatment on the intermediate product and the auxiliary carbon source. A size of a molecule of the auxiliary carbon source may be greater than the distance between the metal compound layers in the intermediate product and a size of a molecule of the main carbon source, and the intermediate product may further include a carbon shell layer surrounding the metal compound layers and the main carbon sources.

In some embodiments, the first thermal treatment may be performed at a first temperature, and the second thermal treatment may be performed in a nitrogen gas or inert gas atmosphere at a second temperature higher than the first temperature.

In still another aspect, a secondary battery may include a positive electrode including the composite material described above, a negative electrode spaced apart from the positive electrode and including at least one of lithium, sodium, or magnesium, and an electrolyte between the positive electrode and the negative electrode.

In some embodiments, molybdenum and selenium of the metal compound layer may be chemically separated from each other through a preliminary charge/discharge process, and the selenium chemically separated in the metal compound layer may function as an active material. A lithium selenium compound may be generated in a charge/discharge process, and the lithium selenium compound may be tied by the carbon layers to reduce elution of the lithium selenium compound into the electrolyte.

In yet another aspect, a secondary battery may include a negative electrode including the composite material described above, a positive electrode spaced apart from the negative electrode, and a separator and an electrolyte between the negative electrode and the positive electrode.

In yet still another aspect, a capacitor may include a negative electrode including the composite material described above, a positive electrode, and a separator and a non-aqueous electrolyte including lithium salt, which are disposed between the negative electrode and the positive electrode.

BRIEF DESCRIPTION OF THE DRAWINGS

FIG. 1 is a flowchart illustrating a method of fabricating a composite material according to some embodiments of the inventive concepts.

FIG. 2 is a schematic view illustrating a composite material according to some embodiments of the inventive concepts.

FIG. 3 is an enlarged view of a portion of FIG. 2.

FIG. 4 is a view illustrating a composite material and a method of fabricating the same, according to a modified example of some embodiments of the inventive concepts.

FIG. 5 is a schematic view illustrating a lithium selenium secondary battery including a composite material according to some embodiments of the inventive concepts.

FIGS. 6 and 7 are transmission electron microscopy (TEM) images of a composite material according to an experimental example 2 of the inventive concepts.

FIG. 8 is a TEM image of the composite material according to the experimental example 2 of the inventive concepts.

FIG. 9 is a schematic diagram illustrating a chemical reaction of selenium in a charge/discharge process of a lithium ion secondary battery including molybdenum and selenium, according to some embodiments of the inventive concepts.

FIG. 10 is a graph showing measurement results of battery capacity characteristics according to a charge/discharge cycle number of lithium ion secondary batteries according to experimental examples 2 and 3 of the inventive concepts.

FIG. 11 is a graph showing measurement results of battery capacity characteristics according to a current density of lithium ion secondary batteries according to experimental examples 1 and 2 of the inventive concepts.

FIG. 12 is a graph showing measurement results of battery capacity characteristics according to a charge/discharge cycle number of a lithium ion secondary battery using the composite material of the experimental example 2 of the inventive concepts as a negative electrode and using commercial lithium cobalt oxide ($LiCoO_2$) as a positive electrode.

FIG. 13 is a graph showing measurement results of voltage and battery capacity characteristics of the lithium ion secondary battery using the composite material of the experimental example 2 of the inventive concepts as the negative electrode and using commercial lithium cobalt oxide ($LiCoO_2$) as the positive electrode.

FIG. 14 is a graph showing measurement results of battery capacity characteristics according to a charge/discharge cycle number of a lithium selenium secondary battery using the composite material according to the experimental example 2 of the inventive concepts.

FIG. 15 is a graph showing measurement results of voltage and battery capacity characteristics of the lithium selenium secondary battery using the composite material according to the experimental example 2 of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

FIG. 1 is a flowchart illustrating a method of fabricating a composite material according to some embodiments of the inventive concepts, and FIG. 2 is a schematic view illustrating a composite material according to some embodiments of the inventive concepts. FIG. 3 is an enlarged view of a portion of FIG. 2.

Referring to FIGS. 1 and 2, a molybdenum source, a selenium source, and a main carbon source are prepared (S110).

For example, the molybdenum source may be $Na_2MoO_4$ $2H_2O$ or $MoO_3$, and the main carbon source may include at least one of ethyleneglycol, diethylene glycol, triethylene glycol, polyethyleneglycol, antracene, naphthalene, benzene, acetylene, dopamine, quinone, alkyl amine (C2 to C12), or sucrose. For example, the selenium source may include a hydrazine solution in which selenium powder dissolves.

The molybdenum source, the selenium source, and the main carbon source may be mixed with each other, and a first thermal treatment may be performed on a mixture thereof to form an intermediate product (S120). For example, the first thermal treatment may be performed in the atmosphere (i.e., in an air atmosphere) at 200° C. for 10 hours, and the intermediate product may be cleaned by water and ethanol after obtaining the intermediate product.

In some embodiments, the molybdenum source, the selenium source, and the main carbon source may be mixed with each other in a solvent (e.g., water), and the first thermal treatment may be performed on a mixture thereof to form the intermediate product.

Alternatively, in other embodiments, the main carbon source may be a solution including carbon. In this case, the molybdenum source, the selenium source, and the main carbon source may be mixed with each other without an additional solvent, and the first thermal treatment may be performed on the mixture thereof to form the intermediate product.

The intermediate product may include metal compound layers and the main carbon sources, which are alternately and repeatedly stacked. Here, each of the metal compound layers may include molybdenum and selenium. In other words, the mixture of the molybdenum source, the selenium source and the main carbon source may be treated by the first thermal treatment to form the intermediate product in which the metal compound layers including molybdenum and selenium and the main carbon sources are alternately and repeatedly stacked.

In the intermediate product, at least a portion of the metal compound layer may be provided as a monolayer of a compound (e.g., $MoSe_2$) of molybdenum and selenium.

A second thermal treatment may be performed on the intermediate product to fabricate a composite material 100 that includes carbon layers 110 and the metal compound layers 120 alternately and repeatedly stacked (S130). For example, the second thermal treatment may be performed in a nitrogen or argon atmosphere at a temperature of 200° C. to 1300° C. for a time of 2 hours to 5 hours.

The main carbon source between the metal compound layers 120 may be carbonized by the second thermal treatment. Thus, the main carbon source provided between the metal compound layers 120 in the intermediate product may be carbonized to form the carbon layer 110. For example, the carbon layer 110 may be a graphene layer or a graphene oxide layer.

Since the main carbon source between the metal compound layers 120 is carbonized to form the carbon layer 110, a distance between the metal compound layers 120 may be reduced. In other words, the distance between the metal compound layers 120 in the composite material 100 may be smaller than a distance between the metal compound layers 120 in the intermediate product. For example, the distance between the metal compound layers 120 in the composite material 100 may range from 5 Å to 15 Å.

In some embodiments, the temperature of the second thermal treatment may be higher than the temperature of the first thermal treatment. In addition, the second thermal treatment may be performed in a non-oxygen atmosphere or an inert gas atmosphere (e.g., the nitrogen or argon atmosphere), as described above. Thus, the main carbon source may be easily carbonized to form the carbon layer 110.

Furthermore, in some embodiments, a time for which the first thermal treatment is performed may be longer than a time for which the second thermal treatment is performed.

As described above, according to some embodiments of the inventive concepts, the metal compound layer 120 including molybdenum and selenium may be inherently provided between the carbon layers 110. In other words, a metal compound layer is not inserted between stacked carbon layers, but the composite material 100 in which the carbon layers 110 and the metal compound layers 120 are alternately and repeatedly stacked may be fabricated by the process of mixing the main carbon source, the molybdenum source and the selenium source, the process of performing the first thermal treatment on the mixture to form the intermediate product, and the process of performing the second thermal treatment on the intermediate product. In other words, the metal compound layers 120 may be formed before the carbon layers 110 in the structure in which the carbon layers 110 and the metal compound layers 120 are alternately and repeatedly stacked.

If a material of a structure including carbon layers and selenium-containing layers alternately and repeatedly stacked is non-inherently fabricated using a process of inserting selenium between stacked carbon layers unlike the above embodiment of the inventive concepts, selenium of the selenium-containing layer may easily escape to the outside. In this case, it is difficult to improve or increase a content of selenium in the material. In particular, if the material is used as a positive active material of a lithium selenium secondary battery, a lithium selenium compound generated in a charge/discharge process may be easily eluted into an electrolyte to deteriorate charge/discharge characteristics and life characteristics of the lithium selenium secondary battery.

However, according to the aforementioned embodiments of the inventive concepts, the metal compound layer 120 may be inherently provided between the carbon layers 110, and thus the metal compound layer 120 may be inherently tied by the carbon layers 110. As a result, when the lithium selenium secondary battery is fabricated using the composite material 100 of the embodiment of the inventive concepts as a positive active material of the lithium selenium secondary battery, a lithium selenium compound generated in a charge/discharge process may be tied by the carbon layers 110, thereby reducing or minimizing elution of selenium into an electrolyte. In addition, the conductivity of the positive active material for a lithium selenium secondary battery may be improved by the carbon layer 110 between the metal compound layers 120. Furthermore, since the metal compound layer 120 is inherently provided between the carbon layers 110, it is possible to improve or increase a content of selenium in the composite material 100. As a result, a high-capacity and long-life lithium selenium secondary battery may be provided.

According to a modified example of some embodiments of the inventive concepts, a carbon shell layer may further be provided to surround the carbon layers and the metal compound layers which are alternately stacked. A composite material and a method of fabricating the same, according to the modified example of the inventive concepts, will be described hereinafter with reference to FIG. 4.

FIG. 4 is a view illustrating a composite material and a method of fabricating the same, according to a modified example of some embodiments of the inventive concepts.

Referring to FIG. 4, the molybdenum source, the selenium source, and the main carbon source are prepared, as described with reference to FIGS. 1 to 3.

An auxiliary carbon source may further be prepared in addition to the main carbon source. In some embodiments, a size of a molecule of the auxiliary carbon source may be greater than a size of a molecule of the main carbon source. In more detail, the size of the molecule of the auxiliary carbon source may be greater than the distance between the metal compound layers in the intermediate product. Thus, the auxiliary carbon source may not be provided between the metal compound layers but may surround the intermediate product in which the metal compound layers and the main carbon sources are alternately and repeatedly stacked.

In some embodiments, the auxiliary carbon source may be mixed with the main carbon source, the molybdenum source and the selenium source, and the first thermal treatment described with reference to FIGS. 1 to 3 may be performed on a mixture of the auxiliary carbon source, the main carbon source, the molybdenum source and the selenium source. Thus, the auxiliary carbon source may surround the intermediate product.

Alternatively, in other embodiments, the main carbon source, the molybdenum source and the selenium source may be mixed with each other, and the first thermal treatment may be performed on the mixture thereof to form the intermediate product, as described with reference to FIGS. 1 to 3. Thereafter, the auxiliary carbon source may be mixed with the intermediate product. In this case, an auxiliary thermal treatment may be performed after mixing the intermediate product and the auxiliary carbon source. Thus, the auxiliary carbon source may surround the intermediate product.

A second thermal treatment may be performed on the intermediate product and the auxiliary carbon source surrounding the intermediate product. The second thermal treatment may be performed by the same method as described with reference to FIGS. 1 to 3.

The main carbon sources in the intermediate product and the auxiliary carbon source may be carbonized to form the carbon layers 110 and the carbon shell layer 130, respectively.

The carbon shell layer 130 may surround at least a portion of a surface of the composite material 100 described with reference to FIGS. 1 to 3, in which the carbon layers 110 and the metal compound layers 120 are alternately and repeatedly stacked.

According to the modified example of embodiments of the inventive concepts, the carbon shell layer 130 may further be provided to surround the composite material 100 in which the metal compound layers 120 and the carbon layers 110 are alternately and repeatedly stacked. Thus, when a lithium selenium secondary battery is fabricated using the composite material 100 having the carbon shell layer 130 as a positive active material, a lithium selenium compound generated in a charge/discharge process may be tied by the stacked carbon layers and may be surrounded by the carbon shell layer 130. Thus, elution of selenium into an electrolyte may be reduced or minimized. As a result, a high-capacity and long-life lithium selenium secondary battery may be provided.

A lithium selenium secondary battery fabricated using the positive active material including the composite material according to the embodiment and/or the modified example of the inventive concepts will be described hereinafter with reference to FIG. 5.

FIG. 5 is a schematic view illustrating a lithium selenium secondary battery including a composite material according to some embodiments of the inventive concepts.

Referring to FIG. 5, a lithium selenium secondary battery may include a positive electrode 210, a negative electrode 220, and an electrolyte 230 disposed between the positive electrode 210 and the negative electrode 220. Even though not shown in FIG. 5, a separator may further be provided between the positive electrode 210 and the negative electrode 220.

The positive electrode 210 may use at least one of the composite materials described with reference to FIGS. 1 to 4 as a positive active material for a lithium selenium secondary battery. In detail, the positive electrode 210 may include a current collector and the composite material deposited on the current collector. In more detail, selenium included in the metal compound layer of the composite material may function as the positive active material.

The negative electrode 220 may include lithium.

The electrolyte 230 may be an aqueous electrolyte or a non-aqueous electrolyte. However, a kind of the electrolyte 230 is not limited thereto and may be various.

A preliminary charge/discharge process may be performed before the secondary battery is charged and discharged. The preliminary charge/discharge process may be performed one or more times. The preliminary charge/discharge process may be performed to electrochemically separate molybdenum and selenium of the metal compound layer of the positive active material for a lithium selenium secondary battery. The selenium chemically separated in the metal compound layer may function as the positive active material. In other words, the metal and selenium, which are chemically separated from each other in the metal compound layer, may be provided between the carbon layers in the positive active material for a lithium selenium secondary battery.

In the above embodiment, the composite material is used as the positive active material of the secondary battery. However, embodiments of the inventive concepts are not limited thereto. In other embodiments, the composite materials according to the inventive concepts may be used in various electrochemical devices. In detail, the composite materials may be used as a negative active material of a lithium ion secondary battery, a negative active material of a lithium ion capacitor, or an electrode of a water electrolysis device.

Experimental examples of the positive active material for a lithium selenium secondary battery according to embodiments of the inventive concepts will be described hereinafter.

Fabrication of Composite Material According to Experimental Example 1

$Na_2MoO_4$ was prepared as a molybdenum source, and a hydrazine solution in which selenium powder was dissolved was prepared as a selenium source. Ethylene glycol was prepared as a main carbon source. 3.46 mmol of $Na_2MoO_4$ and 8 mmol of selenium dissolved in 10 mL of the hydrazine solution were provided into an autoclave. 20 mL of ethylene glycol and 10 mL of water were added into the autoclave, and a first thermal treatment was performed at 200° C. for 10 hours to form an intermediate product corresponding to a composite material according to the experimental example 1.

The intermediate product was obtained, and the obtained intermediate product was cleaned by water and ethanol.

Fabrication of Composite Material According to Experimental Example 2

An intermediate product was formed by performing the same processes as described in the experimental example 1, and a second thermal treatment was performed on the intermediate product in an argon atmosphere at 600° C. to fabricate a composite material of the experimental example 2, in which molybdenum selenide layers and carbon layers were alternately and repeatedly stacked.

Fabrication of Lithium Ion Secondary Battery According to Experimental Example 1

A positive electrode for a half cell was fabricated by mixing the composite material according to the experimental example 1, carbon black and PVdF at a mixing ratio of 6:2:2, and lithium metal foil was used as a negative electrode. In addition, 1M of $LiPF_6$ was used as lithium salt, and ethylene carbonate (EC) and dimethylcarbonate (DMC) were mixed with each other at a mixing ratio of 1:1. Thus, a lithium ion secondary battery according to the experimental example 1 was fabricated.

Fabrication of Lithium Ion Secondary Battery According to Experimental Example 2

A lithium ion secondary battery according to the experimental example 2 was fabricated using the composite material according to the experimental example 2 by the same processes as described in the above experimental example 1.

In detail, a positive electrode for a half cell was fabricated by mixing the composite material according to the experimental example 2, carbon black and PVdF at a mixing ratio of 6:2:2, and lithium metal foil was used as a negative electrode. In addition, 1M of $LiPF_6$ was used as lithium salt, and ethylene carbonate (EC) and dimethylcarbonate (DMC) were mixed with each other at a mixing ratio of 1:1. Thus, the lithium ion secondary battery according to the experimental example 2 was fabricated.

FIGS. 6 and 7 are transmission electron microscopy (TEM) images of a composite material according to an experimental example 2 of the inventive concepts.

Referring to FIGS. 6 and 7, TEM images of the composite material according to the experimental example 2 were acquired.

As shown in FIGS. 6 and 7, the composite material according to the experimental example 2 has the structure in which the molybdenum selenide layers and the carbon layers are alternately and repeatedly stacked. In addition, as shown in FIG. 7, a distance between the molybdenum selenide layers is about 0.67 nm.

FIG. 8 is a TEM image of the composite material according to the experimental example 2 of the inventive concepts.

Referring to FIG. 8, a TEM image of the composite material according to the experimental example 2 was acquired. As shown in FIG. 8, the molybdenum selenide layers and the carbon layers are alternately and repeatedly stacked.

FIG. 9 is a schematic diagram illustrating a chemical reaction of selenium in a charge/discharge process of a lithium ion secondary battery including molybdenum and selenium, according to some embodiments of the inventive concepts.

Referring to FIG. 9, molybdenum (Mo) and lithium selenide ($Li_2Se$) are formed through a lithium intercalation reaction (1) and a lithium conversion reaction (2). Next, molybdenum selenide and a selenium element ($Se^0$) are generated through a lithium deintercalation reaction (3). As charge/discharge reactions are continuously performed, the electrochemical reactions (1) to (3) decrease but a lithium intercalation/deintercalation reaction (4) increases. The reaction (4) may be the same as an electrochemical reaction of a conventional lithium selenium secondary battery.

In detail, as illustrated in FIG. 9, the selenium chemically separated from the metal compound layer by the preliminary charge/discharge process may react with lithium to generate a lithium selenium compound ($Li_2Se \leftrightarrow Se$). In more detail, in lithiation, $Li_2Se$ and Mo may be generated through the lithium intercalation reaction ($MoSe_2 + xLi^+ + xe^- \rightarrow Li_xMoSe_2$) (1) and the conversion reaction ($Li_xMoSe_2 \rightarrow Li_2Se + Mo$) (2). In delithiation (3), Li2Se may be oxidized into the selenium element ($Se^0$). As the number of charge/discharge cycles increases, $MoSe_2$ may be electrochemically divided into Mo and Se. In this process, the lithium selenium compound may be tied by the carbon layers to inhibit selenium from being eluted into an electrolyte.

In other words, $MoSe_2$ is divided into the molybdenum element and lithium selenide ($Li_2Se$) through the lithium intercalation reaction ($MoSe_2 + Li^+ + e^- \rightarrow Li_xMoSe_2$) and the lithium conversion reaction ($Li_xMoSe_2 \rightarrow Mo + Li_2Se$) in the first charge/discharge cycle. In discharging, the selenium element ($Se^0$) is generated by the lithium deintercalation reaction.

FIG. 10 is a graph showing measurement results of battery capacity characteristics according to a charge/discharge cycle number of lithium ion secondary batteries according to experimental examples 2 and 3 of the inventive concepts.

Referring to FIG. 10, battery capacity characteristics according to a charge/discharge cycle number of the lithium ion secondary battery (annealed) according to the experimental example 2 and the lithium ion secondary battery (as-prepared) according to the experimental example 1 were measured by a constant current constant voltage (CCCV) measuring method under conditions of a voltage of 0.01V to 3V and a current density of 0.1 C.

The lithium ion secondary battery according to the experimental example 1, which includes the intermediate product on which the second thermal treatment is not performed, has a very great initial capacity loss and a battery capacity of 100 mAh/g or less. On the contrary, the lithium ion secondary battery according to the experimental example 2, which includes the composite material on which the second thermal treatment is performed, has a battery capacity of 600 mAh/g to 1,100 mAh/g. In addition, the battery capacity of the lithium ion secondary battery of the experimental example 2 does not decrease but increases as the number of the charge/discharge cycles increases.

FIG. 11 is a graph showing measurement results of battery capacity characteristics according to a current density of lithium ion secondary batteries according to experimental examples 1 and 2 of the inventive concepts.

Referring to FIG. 11, a reference designator (1) shows results obtained by measuring capacity characteristics according to a charge/discharge cycle number of the lithium ion secondary battery according to the experimental example 2 under conditions that a C-rate is controlled from 0.05 C to 2 C and then is controlled from 2 C to 0.05 C and 10 cycles are maintained at each C-rate. A reference designator (2) shows results obtained by measuring capacity characteristics according to a charge/discharge cycle number of the lithium ion secondary battery according to the experimental example 2 under conditions that a C-rate is controlled from 0.05 C to 2 C and 10 cycles are maintained at each C-rate. A reference designator (3) shows results obtained by measuring capacity characteristics according to a charge/discharge cycle number of the lithium ion secondary battery according to the experimental example 1 under conditions that a C-rate is controlled from 0.05 C to 2 C and 10 cycles are maintained at each C-rate. In other words, the reference designators (1) and (2) of FIG. 11 show the battery capacities of the lithium ion secondary battery according to the experimental example 2, and the reference designator (3) of FIG. 11 shows the battery capacities of the lithium ion secondary battery according to the experimental example 1.

The lithium ion secondary battery including the positive active material (i.e., the composite material) on which the second thermal treatment is performed at 600° C. shows excellent rate capability characteristics, as compared with the lithium ion secondary battery including the positive active material on which the second thermal treatment is not performed. In particular, the lithium ion secondary battery of the experimental example 2 (600° C.) has a capacity of 550 mAh/g at the condition of 2 C and has a capacity of 250 mAh/g at a condition of 10 C (a charging time of 6 minutes).

FIG. 12 is a graph showing measurement results of battery capacity characteristics according to a charge/discharge cycle number of a lithium ion secondary battery using the composite material of the experimental example 2 of the inventive concepts as a negative electrode and using commercial lithium cobalt oxide ($LiCoO_2$) as a positive electrode. FIG. 13 is a graph showing measurement results of voltage and battery capacity characteristics of the lithium ion secondary battery using the composite material of the experimental example 2 of the inventive concepts as the negative electrode and using commercial lithium cobalt oxide ($LiCoO_2$) as the positive electrode.

Referring to FIG. 12, a lithium ion full cell battery was fabricated using the composite material of the experimental example 2 as a negative electrode and using commercial lithium cobalt oxide as a positive electrode, and capacity characteristics according to a charge/discharge cycle number thereof were measured. At this time, a current density was 100 mA/g, and a cell formation process was performed at OCV of 4.2V by a CCCV experimental method. Thereafter, a charge/discharge experiment was performed between 4.2V and 1.2V.

A capacity was reduced by 200 mAh/g while first to fifth charge/discharge cycles were performed, but a capacity of about 700 mAh/g was stably maintained while the following charge/discharge cycles were continuously performed.

Referring to FIG. 13, an average battery voltage was 2.7V, and the lithium ion secondary battery showed an energy density of 327 Wh/kg as a result of calculating the energy density based on an actual capacity of the two materials used as the negative electrode and the positive electrode.

FIG. 14 is a graph showing measurement results of battery capacity characteristics according to a charge/discharge cycle number of a lithium selenium secondary battery using the composite material according to the experimental example 2 of the inventive concepts. FIG. 15 is a graph showing measurement results of voltage and battery capacity characteristics of the lithium selenium secondary battery using the composite material according to the experimental example 2 of the inventive concepts.

Referring to FIGS. 14 and 15, a cell formation process was performed on the lithium selenium secondary battery using the composite material of the experimental example 2. The cell formation process was performed using a current density of 100 mA/g between 0.01 and 3V by a CCCV experimental method. Thereafter, a charge/discharge experiment was performed on the lithium selenium secondary battery between 1V and 3V. Selenium of 34 wt % was reflected in a graph of a battery weight capacity.

An initial coulombic efficiency was 95%, and coulombic efficiencies were 100% or more since 10 cycles. An average weight battery capacity was 750 mAh/g, and a battery voltage was 1.9V. Thus, the lithium selenium secondary battery showed an energy density of 595 Wh/kg and had excellent capacity retention characteristics.

The lithium selenium secondary battery including the composite material according to the aforementioned embodiments of the inventive concepts may be applied to various applications. For example, the lithium selenium secondary battery according to the embodiments of the inventive concepts may be applied to electric cars requiring high energy density and high output power density. The applications of the lithium selenium secondary battery according to the embodiments of the inventive concepts are not limited thereto but may also be applied to other various fields such as energy storage systems (ESS) and mobile electronic devices. Furthermore, the molybdenum selenide/carbon composite material may also be used as a negative active material of a new lithium ion capacitor with high output power density.

The composite material according to the embodiments of the inventive concepts may include the carbon layers and the metal compound layers, which are alternately and repeatedly stacked. Each of the metal compound layers may include molybdenum and selenium. The carbon layer may be inherently provided between the metal compound layers, and thus the metal compound layer may be inherently tied between the carbon layers.

Therefore, when the lithium selenium secondary battery is fabricated using the composite material as the positive active material, it is possible to inhibit the lithium selenium compound, generated in the charge/discharge process, from being eluted into the electrolyte. As a result, the highly reliable lithium selenium secondary battery with improved life and capacity characteristics may be provided or realized.

In addition, when the lithium ion secondary battery is fabricated using the composite material, the carbon layers included in the composite material may improve conductivity and stability of an electrode. As a result, the highly reliable lithium ion secondary battery with improved life and capacity characteristics may be provided or realized.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A composite material comprising:
graphene layers and metal compound layers alternately and repeatedly stacked, wherein each of the metal compound layers includes molybdenum and selenium.

2. The composite material of claim 1, wherein a distance between the metal compound layers ranges from 5 Å to 15 Å.

3. The composite material of claim 1, further comprising:
a carbon shell layer surrounding the graphene layers and the metal compound layers alternately and repeatedly stacked.

4. The composite material of claim 1, wherein at least a portion of the metal compound layer is provided as a monolayer.

5. A method of fabricating a composite material, the method comprising:
preparing a molybdenum source, a selenium source, and a main carbon source;
mixing the molybdenum source, the selenium source, and the main carbon source with each other to obtain a mixture thereof;
forming an intermediate product by performing a first thermal treatment on the mixture; and
performing a second thermal treatment on the intermediate product to fabricate a composite material comprising graphene layers and metal compound layers alternately and repeatedly stacked,
wherein each of the metal compound layers includes molybdenum and selenium, and
wherein the main carbon source comprises at least one of ethyleneglycol, diethylene glycol, triethylene glycol, polyethyleneglycol, antracene, naphthalene, benzene, acetylene, dopamine, quinone, alkyl amine (C2~C12), or sucrose.

6. The method of claim 5, wherein the intermediate product comprises: the metal compound layers and the main carbon source alternately and repeatedly stacked,
wherein each of the metal compound layers of the intermediate product includes molybdenum and selenium, and
wherein a distance between the metal compound layers in the intermediate product is greater than a distance between the metal compound layers in the composite material.

7. The method of claim 6, further comprising:
adding an auxiliary carbon source to the intermediate product before the performing of the second thermal treatment on the intermediate product; and
performing an auxiliary thermal treatment on the intermediate product and the auxiliary carbon source,
wherein a size of a molecule of the auxiliary carbon source is greater than the distance between the metal compound layers in the intermediate product and a size of a molecule of the main carbon source, and
wherein the intermediate product further comprises a carbon shell layer surrounding the metal compound layers and the main carbon sources.

8. The method of claim 5, wherein the first thermal treatment is performed at a first temperature, and
wherein the second thermal treatment is performed in a nitrogen gas or inert gas atmosphere at a second temperature higher than the first temperature.

9. A secondary battery comprising:
a positive electrode including the composite material of claim 1;
a negative electrode spaced apart from the positive electrode and including at least one of lithium, sodium, or magnesium; and
an electrolyte between the positive electrode and the negative electrode.

10. The secondary battery of claim 9, wherein molybdenum and selenium of the metal compound layer are chemically separated from each other through a preliminary charge/discharge process,
wherein the selenium chemically separated in the metal compound layer functions as an active material,
wherein a lithium selenium compound is generated in a charge/discharge process, and
wherein the lithium selenium compound is tied by the graphene layers.

11. A capacitor comprising:
a negative electrode including the composite material of claim 1;
a positive electrode; and
a separator and a non-aqueous electrolyte including lithium salt, which are disposed between the negative electrode and the positive electrode.

* * * * *